(No Model.)
G. C. FORBES & B. PRICKETT.
CHURN.
No. 506,107. Patented Oct. 3, 1893.
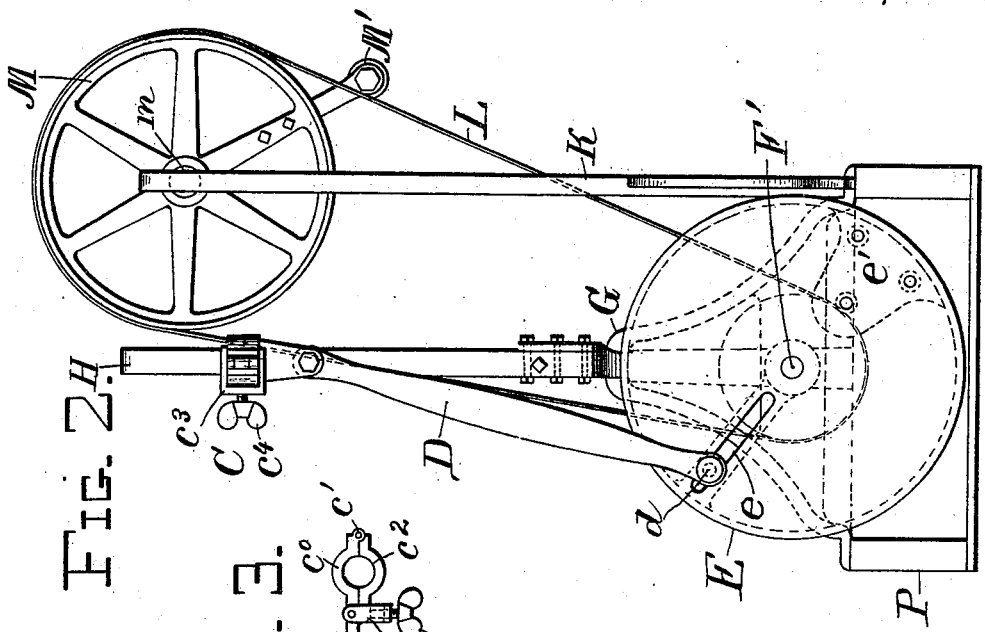
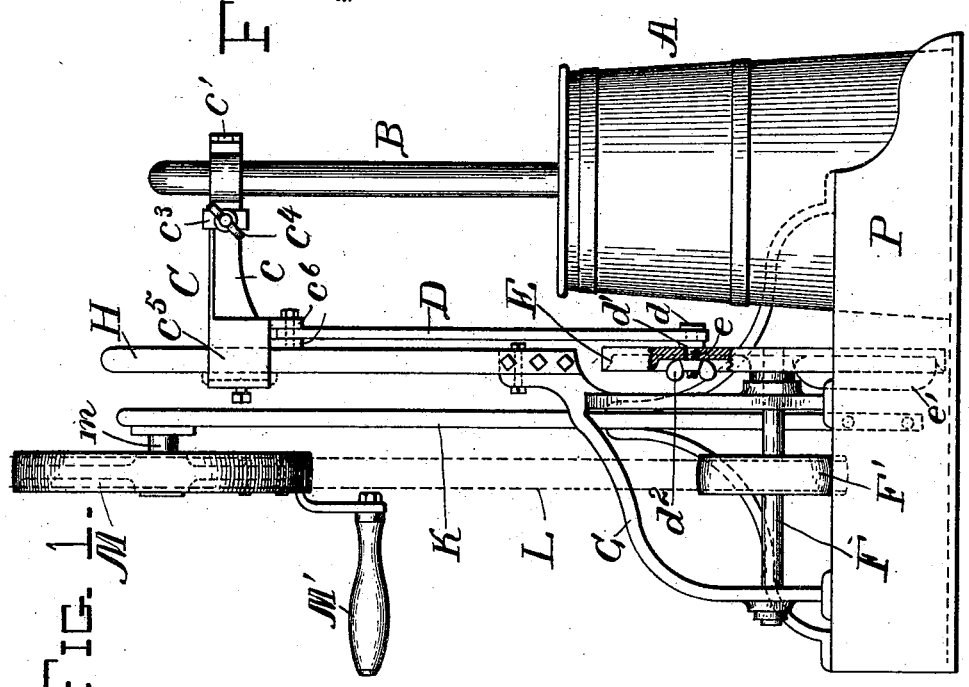
Witnesses
Percy C. Bowen
J. M. Nale
Inventors
Grover C. Forbes &
Brantley Prickett,
By Whitman & Wilkinson,
Attorneys.

United States Patent Office.

GROVES C. FORBES, OF MAYSVILLE, AND BRANTLY PRICKETT, OF HOMER, GEORGIA.

CHURN.

SPECIFICATION forming part of Letters Patent No. 506,107, dated October 3, 1893.

Application filed August 4, 1893. Serial No. 482,365. (No model.)

*To all whom it may concern:*

Be it known that we, GROVES C. FORBES, residing at Maysville, and BRANTLY PRICKETT, residing at Homer, in the county of Banks and State of Georgia, citizens of the United States, have invented certain new and useful Improvements in Churns; and we do hereby declare the following to be a full, clear, and exact description of the invention, such as will enable others skilled in the art to which it appertains to make and use the same.

Our invention relates to improvements in churns, and it consists in certain novel features hereinafter described and claimed.

Reference is had to the accompanying drawings, wherein the same parts are indicated by the same letters.

Figure 1 represents an end view of the churn and its attachments, part of the flywheel being broken away to show the manner of securing the connecting rod thereto. Fig. 2 represents a side elevation of the machine, the churn being omitted, and the view being taken from the right of Fig. 1. Fig. 3 represents the clamp for connecting the dasher to the cross-head C.

A represents the churn provided with a reciprocating dasher B, which is rigidly connected to the cross head C. This cross head is provided with a projecting arm $c$ bent at $c^0$, and provided with a clamp piece $c^2$ pivoted at $c'$ to the arm $c$, and held at its opposite end by the loops $c^3$ and clamp screw $c^4$. The inner end of the cross head $c$ is provided with a bearing box $c^5$ adapted to slide up and down on the stanchion H which is secured to the frame G mounted on the support P. The connecting rod D is pivotally connected to the legs $c^6$ projecting beneath the cross head C, and to the bolt $d$ adjustably mounted in the slot $e$ of the flywheel E. By means of the plate $d'$ rigidly attached to the bolt $d$ and the clamp screw $d^2$, the bolts $d$ may be clamped at any desired part of the slot $e$, and thus the length of the crank arm may be varied at will.

The flywheel E should preferably be provided with a counterpoise $e'$ to balance the weight of the connecting rod and attachments connected to the opposite side of the flywheel. The said fly-wheel is mounted upon the shaft F carrying the pulley F' which is driven by the belt L and pulley M carrying the handle M'. This pulley M is mounted on a shaft $m$ journaled in the upright K forming a part of the framework of the machine.

It will be seen that the churn is placed at one side of the machine and away from the operator, and from the operating parts of the machine, and thus the inconvenience due to unavoidable splashing is to a large degree obviated. It will be seen moreover, that the churn may be connected to the machine, and put into position or removed with great facility.

Having thus described our invention, what we claim, and desire to secure by Letters Patent of the United States, is—

In a machine of the character described, the combination with the churn A and dasher B, of the cross head C, provided with projecting arm $c$, curved as at $c^0$, the clamp piece $c^2$ pivoted at $c'$ to said arm, the loop $c^3$, and clamp screw $c^4$, adapted to clamp said dasher to said cross head, the frame G, guide H; fly wheel E slotted as at $e$ and weighted as at $e'$ opposite to said slot; the connecting rod D, connected to said cross head, the bolt $d$ connecting said rod D to said slotted flywheel, the clamp screw $d^2$ clamping said bolt at any desired position in said slot, and means for revolving said fly wheel and reciprocating said cross head, substantially as and for the purposes described.

In testimony whereof we affix our signatures in presence of two witnesses.

GROVES C. FORBES.
BRANTLY PRICKETT.

Witnesses:
H. J. DAVID,
J. W. SUMPTER.